United States Patent
Jung et al.

(10) Patent No.: US 9,759,856 B2
(45) Date of Patent: Sep. 12, 2017

(54) CURVED BACKLIGHT UNIT AND CURVED DISPLAY APPARATUS INCLUDING THE SAME

(71) Applicant: SAMSUNG ELECTRONICS CO., LTD., Suwon-si (KR)

(72) Inventors: Taesung Jung, Seoul (KR); Dongouk Kim, Pyeongtaek-si (KR); Joonyong Park, Suwon-si (KR); Jihyun Bae, Seoul (KR); Bongsu Shin, Seoul (KR); Sunghoon Lee, Seoul (KR); Jaeseung Chung, Suwon-si (KR); Alexander V. Morozov, Moscow area (RU)

(73) Assignee: SAMSUNG ELETRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/154,343

(22) Filed: May 13, 2016

(65) Prior Publication Data
US 2017/0052312 A1    Feb. 23, 2017

(30) Foreign Application Priority Data
Aug. 20, 2015    (KR) ........................ 10-2015-0117561

(51) Int. Cl.
*F21V 7/04*    (2006.01)
*F21V 7/10*    (2006.01)
(Continued)

(52) U.S. Cl.
CPC ......... *G02B 6/0068* (2013.01); *G02B 6/0036* (2013.01); *G02B 6/0058* (2013.01); *G02B 6/0065* (2013.01); *G02B 27/2214* (2013.01)

(58) Field of Classification Search
CPC .. G02B 6/0068; G02B 6/0036; G02B 6/0065; G02B 6/0058; G02B 27/2214
See application file for complete search history.

(56) References Cited

U.S. PATENT DOCUMENTS 7,474,415 B2    1/2009    Lin et al.
7,667,786 B2    2/2010    Nouchi et al.
(Continued)

FOREIGN PATENT DOCUMENTS

JP              11-149566 A       6/1999
KR      10-2007-0102989 A      10/2007
KR         10-1302402 B1       9/2013

OTHER PUBLICATIONS

Toda, et al.; "3D Video System Using Grating Image", SPIE, Apr. 1995, vol. 2406, 8 pages total.

*Primary Examiner* — Donald Raleigh
(74) *Attorney, Agent, or Firm* — Sughrue Mion, PLLC

(57) ABSTRACT

A curved backlight unit is provided. The backlight unit includes a curved light guide plate having a curvature, a first light source configured to provide a first illumination light to a first surface of the curved light guide plate, an array of a plurality of different grating elements disposed on a second surface of the curved light guide plate and configured to allow the first illumination light to exit the curved light guide plate from the second surface, and a second light source configured to provide a second illumination light to a third surface facing the second surface of the curved light guide plate. The curved light guide plate includes a first area configured to allow the second illumination light to exist at a first intensity and a second area configured to allow the second illumination light to exist at a second intensity that is less than the first intensity.

31 Claims, 12 Drawing Sheets

(51) Int. Cl.
  *F21V 1/00*     (2006.01)
  *F21V 5/00*     (2015.01)
  *F21V 7/00*     (2006.01)
  *F21V 8/00*     (2006.01)
  G02B 27/22      (2006.01)

(56) References Cited

U.S. PATENT DOCUMENTS

| | | |
|---|---|---|
| 8,371,215 B2 | 2/2013 | Rinko |
| 2008/0043490 A1 | 2/2008 | Coleman et al. |
| 2009/0141501 A1* | 6/2009 | Mukawa .............. G02B 3/0056 362/296.1 |
| 2010/0165603 A1 | 7/2010 | Sun et al. |
| 2013/0181896 A1* | 7/2013 | Gruhlke ................ G06F 3/017 345/156 |
| 2014/0078720 A1 | 3/2014 | An et al. |
| 2014/0300947 A1 | 10/2014 | Fattal et al. |
| 2014/0300960 A1 | 10/2014 | Santori et al. |
| 2016/0033705 A1* | 2/2016 | Fattal .................. G02B 6/0068 349/15 |

* cited by examiner

CURVED BACKLIGHT UNIT AND CURVED DISPLAY APPARATUS INCLUDING THE SAME

RELATED APPLICATION

This application claims priority from Korean Patent Application No. 10-2015-0117561, filed on Aug. 20, 2015, in the Korean Intellectual Property Office, the disclosure of which is incorporated herein in its entirety by reference.

BACKGROUND

1. Field

Apparatuses and methods consistent with exemplary embodiments relate to a curved backlight unit and a curved display apparatus including the curved backlight unit, and more particularly to, a curved backlight unit capable of reducing a light leakage phenomenon and a curved display apparatus including the curved backlight unit.

2. Description of the Related Art

Curved display apparatuses have been limited in use to IMAX theaters, simulators, etc. However, since flat display panels have been recently made thinner due to technological developments, household televisions including curved display apparatuses have been released. Since display panels of curved display apparatuses are bent with a certain curvature, a difference in a watching distance between a center and an edge of a screen is reduced, and thus, contrast uniformity of a screen increases. Accordingly, image distortion is reduced and a viewing angle is increased, thereby increasing the sense of depth and image immersion of viewers.

In addition, 3D display technology provides a 3D image to a user. According to 3D display technology, different images are provided to the human eyes so that an observer can perceive a 3D image due to a binocular parallax effect. 3D technologies are divided into glasses-type methods and non-glasses-type methods. Examples of glasses-type methods include a red-green glasses method, a liquid shutter glasses method, a polarizing glasses method, etc. depending on the type of technology used to provide different images to two eyes. Examples of non-glasses-type methods include a lenticular method and a parallax barrier method. A 3D image technology that uses a directional backlight unit including a light guide plate having a surface in which fine gratings provide directional light to each of a plurality of views of a 3D image are formed has been recently proposed.

SUMMARY

According to an aspect of an exemplary embodiment, there is provided a backlight unit including a curved light guide plate having a curvature; a first light source configured to provide a first illumination light to a first surface of the curved light guide plate; an array of a plurality of different grating elements disposed on a second surface of the curved light guide plate and configured to allow the first illumination light to exit the curved light guide plate from the second surface; and a second light source configured to provide a second illumination light to a third surface facing the second surface of the curved light guide plate, wherein the curved light guide plate includes a first area configured to allow the second illumination light to exist at a first intensity and a second area configured to allow the second illumination light to exist at a second intensity that is less than the first intensity.

The curved light guide plate may include a light blocking member disposed in the second area and configured to at least partially absorb or reflect the second illumination light.

The light blocking member may be configured to have a parallel line grating pattern, a matrix or mesh grating pattern, a honeycomb pattern, a fish bone pattern, or a diagonal pattern.

The light blocking member may be disposed on the third surface of the curved light guide plate.

The curved light guide plate may further include a transparent coating layer attached to the third surface of the curved light guide plate, wherein the light blocking member is disposed on the transparent coating layer, and a refractive index of the transparent coating layer is less than a refractive index of the curved light guide plate.

The light blocking member may be disposed on the second surface of the curved light guide plate.

The light blocking member may be disposed in areas between the plurality of grating elements on the second surface of the light guide plate.

The light blocking member may be configured to electrically adjust a transmittance of the second illumination light via an electrowetting phenomenon.

The plurality of different grating elements may include a plurality of first grating elements configured to allow the first illumination light to exit from the second surface at a third intensity and disposed in the first area of the curved light guide plate and a plurality of second grating elements configured to allow the first illumination light to exit from the second surface at a fourth intensity less than the third intensity and disposed in the second area of the curved light guide plate.

A height of the plurality of first grating elements may be greater than a height of the plurality of second grating elements.

A ratio of a pitch and a width of the plurality of first grating elements may be within a range between about 0.4 and about 0.7, and a ratio of a pitch and a width of the plurality of second grating elements may be within a range between about 0.1 and about 0.4 or between about 0.7 and about 0.9.

The plurality of grating elements of the curved light guide plate may have different pitches and orientations to allow the first illumination light to exit in different directions.

The curved light guide plate may be configured to allow the second illumination light to sequentially pass through the third surface and the second surface, and the plurality of grating elements is configured not to influence a travel direction of the second illumination light.

The first light source may include a blue light source configured to provide blue light, a green light source configured to provide green light, and a red light source configured to provide red light, and wherein the second light source includes a white light source configured to provide white light.

The backlight unit may further include: a first transparent electrode disposed on the third surface of the curved light guide plate and a second transparent electrode disposed on the second surface of the curved light guide plate, wherein the second transparent electrode includes an array of a plurality of patterns, and wherein the plurality of grating elements is formed of a material that contracts or expands with temperature.

The backlight unit may further include: a first transparent electrode disposed on an upper surface of the curved light guide plate, a second transparent electrode disposed to face the first transparent electrode, liquid droplets that move according to a voltage applied between the first transparent electrode and the second transparent electrode, and a chamber configured to seal the liquid droplets, wherein the chamber includes a reservoir in which the liquid droplets are collected, wherein a refractive index of the liquid droplets is a same refractive index as a refractive index of the plurality of grating elements, and wherein a part of the plurality of grating elements provided on the curved light guide plate is disposed in the chamber.

According to an aspect of another exemplary embodiment, there is provided a display apparatus including a display panel curved to have a certain curvature; and a backlight unit configured to provide an illumination light to the display panel, wherein the backlight unit includes: a curved light guide plate curved to have a certain curvature; a first light source configured to provide a first illumination light to a first surface of the curved light guide plate; an array of a plurality of different grating elements disposed on a second surface of the light guide plate and configured to allow the first illumination light to exit the curved light guide plate from the second surface; and a second light source configured to provide a second illumination light to a third surface facing the second surface of the curved light guide plate, wherein the curved light guide plate includes a first area configured to allow the second illumination light to exist at a first intensity and a second area configured to allow the second illumination light to exit at a second intensity less than the first intensity.

The display panel and the curved light guide plate may be configured to have same curvature.

The display panel may include a 2D array of a plurality of pixels, and the plurality of grating elements of the curved light guide plate is disposed to correspond to the plurality of pixels of the display panel according to a one to one correspondence.

The plurality of grating elements may be configured to allow the second illumination light that exits from the second surface of the curved light guide plate by one of the plurality of grating elements to be incident onto one of the plurality of pixels of the display panel corresponding to the grating element.

While the display apparatus displays a 3D image, the first light source may be turned on and the second light source is turned off, and while the display apparatus displays a 2D image, the first light source may be turned off and the second light source is turned on.

According to an aspect of another exemplary embodiment, a backlight unit is provided. The backlight unit includes: a curved light guide plate having a curvature; a first light source configured to provide a first illumination light to a first surface of the curved light guide plate; an array of a plurality of different grating elements disposed on a second surface of the curved light guide plate and configured to allow the first illumination light to exit the curved light guide plate from the second surface; and a second light source configured to provide a second illumination light to a third surface facing the second surface of the curved light guide plate.

The plurality of different grating elements may include a plurality of first grating elements configured to allow the first illumination light to exit from the second surface at a first intensity and a plurality of second grating elements configured to allow the first illumination light to exit from the second surface at a second intensity less than the first intensity.

A height of the plurality of first grating elements may be greater than a height of the plurality of second grating elements.

A ratio of a pitch and a width of the plurality of first grating elements may be within a range between about 0.4 and about 0.7, and a ratio of a pitch and a width of the plurality of second grating elements may be within a range between about 0.1 and about 0.4 or between about 0.7 and about 0.9.

The plurality of grating elements of the curved light guide plate may have different pitches and orientations to allow the first illumination light to exit in different directions.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
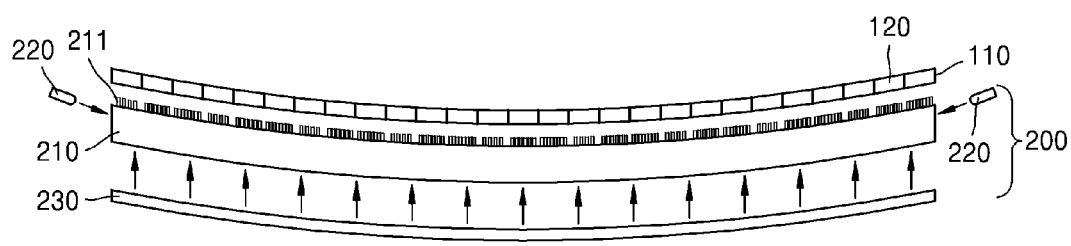
FIG. 1 is a cross-sectional view schematically showing a structure of a curved backlight unit and a curved display apparatus including the curved backlight unit according to an exemplary embodiment.

Hereinafter, with reference to the accompanying drawings, a curved backlight unit and a curved display apparatus including the curved backlight unit will be described in detail. Like reference numerals refer to like elements throughout, and in the drawings, sizes of elements may be exaggerated for clarity and convenience of explanation. The exemplary embodiments described below are merely an example, and various modifications may be possible from the exemplary embodiments. In a layer structure described below, an expression "above" or "on" may include not only "immediately on in a contact manner" but also "on in a non-contact manner".

FIG. 1 is a cross-sectional view schematically showing a structure of a curved backlight unit 200 and a curved display apparatus 100 including the curved backlight unit 200 according to an exemplary embodiment.

Referring to FIG. 1, the curved display apparatus 100 may include a curved display panel 110 having a certain curvature and the curved backlight unit 200 that provides illumination light to the curved display panel 110. The curved backlight unit 200 may include a curved light guide plate 210 having a certain curvature, a first light source 220 that provides first illumination light to a side surface of the curved light guide plate 210, an array of a plurality of grating elements 211 disposed on an upper surface of the curved light guide plate 210, and a second light source 230 that is disposed to face a lower surface of the curved light guide plate 210 and provides second illumination light.

The curved display panel 110 may include a 2D array of a plurality of pixels 120 and may be a liquid crystal display panel. The curved display panel 110 may be manufactured by mechanically pressing a flat panel and bending the flat panel. For example, the curved display panel 110 may differ according to its size but may have a curvature diameter of about 4,200 mm.

The light guide plate 210 may be formed of a transparent material through which light may pass. For example, the light guide plate 210 may be formed of polymethyl methacrylate (PMMA). The light guide plate 210 may be configured to have a rectangular shape having an upper surface and a lower surface and four sides between the upper surface and the lower surface and have the same curvature as that of the curved display panel 110. For example, the light guide plate 210 may be manufactured in the rectangular shape and then mechanically pressed and bent.

The first light source 220 may include a plurality of blue light sources providing blue light, a plurality of green light sources providing green light, and a plurality of red light sources providing red light. For example, the first light source 220 may include a plurality of red light emitting diodes (LEDs), a plurality of green LEDs, and a plurality of blue LEDs. The first light source 220 may be arranged along sides of the light guide plate 210. Although the first light source 220 are illustrated only in left and right sides of the light guide plate 210 in FIG. 1, the first light source 220 may be arranged to face only one side of the light guide plate 210 or the four sides of the light guide plate 210. The first illumination light emitted from the first light source 220 may enter into the light guide plate 210 through the sides of the light guide plate 210. Thereafter, while the first illumination light is totally reflected between the upper surface and the lower surface of the light guide plate 210, the first illumination light may exit via the upper surface of the light guide plate 210 by the grating elements 211 disposed on the upper surface of the light guide plate 210. As will be described later, the first light source 220 may provide the first illumination light while the curved display apparatus 100 displays a 3D image.

The second light source 230 may be configured to provide mixed light including red, green, and blue lights or white light. For example, the second light source 230 may include a diffuser plate (not shown) that uniformly mixes the plurality of red LEDs, the plurality of green LEDs, the plurality of blue LEDs, and light that are uniformly arranged. Alternatively, the second light source 230 may include a plurality of white LEDs. The second light source 230 may be disposed to face the lower surface of the light guide plate 210 and may provide the second illumination light toward the lower surface of the light guide plate 210. The second illumination light emitted from the second light source 230 may pass through the light guide plate 210 from the lower surface of the light guide plate 210 and may exit via the upper surface of the light guide plate 210.

Figure 2:
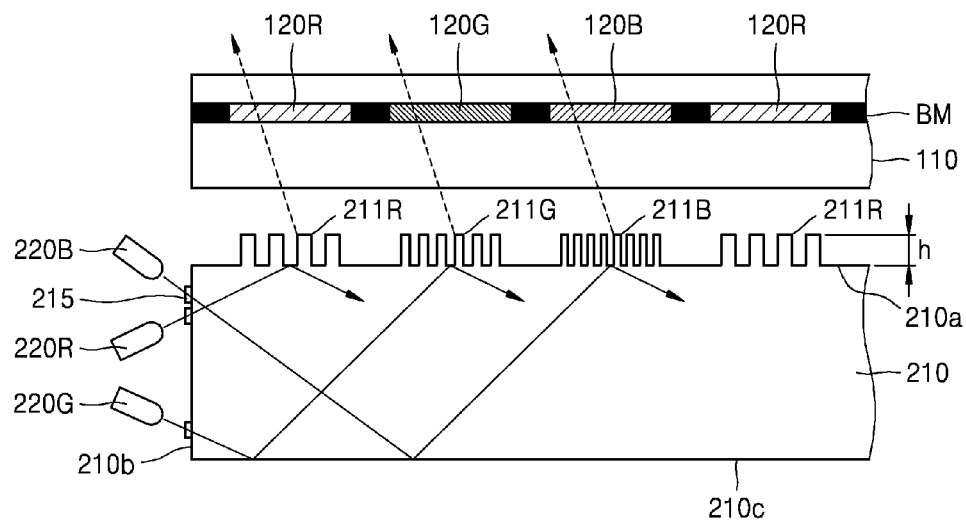
FIG. 2 is a partially enlarged cross-sectional view of a detailed structure of a plurality of grating elements of the curved backlight unit of FIG. 1, according to an exemplary embodiment.

FIG. 2 is a partially enlarged cross-sectional view of a detailed structure of a plurality of grating elements 211R, 211G, and 211B of the curved backlight unit 200 of FIG. 1. Although the second light source 230 is omitted and the curved display panel 110 and the light guide plate 210 are illustrated as having a flat shape for convenience of illustration, the second light source 230 may be disposed to face a lower surface 210c of the light guide plate 210, and the curved display panel 110 and the light guide plate 210 may be curved with a certain curvature. Although only one red light source 220R, one green light source 220G, and one blue light source 220B are illustrated as the first light source 220 in a side 210b of the light guide plate 210 as an example in FIG. 2, the plurality of red light source 220R, the plurality of green light source 220G, and the plurality of blue light source 220B may be arranged along four sides of the light guide plate 210. As shown in FIG. 2, an input coupler 215 is configured to allow red, green, and blue first illumination light respectively emitted from the red light source 220R, the green light source 220G, and the blue light source 220B to reach the light guide plate 210 at a specific angle may be further disposed on the side 210b of the light guide plate 210. The input coupler 215 may collimate the first illumination light to have a parallel beam.

Referring to FIG. 2, the curved display panel 110 may include a 2D array of a plurality of pixels 120R, 120G, and 120B. For example, red filters that transmit only red band light may be disposed in the red pixels 120R, green filters that transmit only green band light may be disposed in the green pixels 120G, and blue filters that transmit only blue band light may be disposed in the blue pixels 120B. A black matrix BM may be disposed between each of the two neighboring pixels 120R, 120G, and 120B.

The plurality of grating elements 211R, 211G, and 211B may be disposed on an upper surface 210a of the light guide plate 210 in a 2D array, like the plurality of pixels 120R, 120G, and 120B of the curved display panel 110. For example, the first grating element 211R may be disposed to face the one red pixel 120R of the curved display panel 110, the second grating element 211G may be disposed to face the one green pixel 120G, and the third grating element 211B may be disposed to face the one blue pixel 120B.

The plurality of grating elements 211R, 211G, and 211B may be configured to exit the first illumination light that travels into the light guide plate 210 through a total reflection to the upper surface 210a of the light guide plate 210 and have no influence on the second illumination light. In particular, the grating elements 211R, 211G, and 211B may have a wavelength selectivity and a directionality such that the second illumination light of a specific wavelength may travel in a specific direction. For example, a part of the red first illumination light that is incident on the upper surface 210a of the light guide plate 210 may be diffracted by the first grating element 211R and may be exited to the outside of the light guide plate 210 through the upper surface 210a of the light guide plate 210. Thereafter, the red first illumination light exited by the first grating element 211R may be incident on the red pixels 120R of the curved display panel 110. A part of the green first illumination light that is incident on the upper surface 210a of the light guide plate 210 may be diffracted by the second grating element 211G and may be exited to the outside of the light guide plate 210 through the upper surface 210a of the light guide plate 210. Thereafter, the green first illumination light exited by the second grating element 211G may be incident on the green pixels 120G of the curved display panel 110. A part of the blue first illumination light that is incident on the upper surface 210a of the light guide plate 210 may be diffracted by the third grating element 211B and may be exited to the outside of the light guide plate 210 through the upper surface 210a of the light guide plate 210. Thereafter, the blue first illumination light exited by the third grating element 211B may be incident on the blue pixels 120B of the curved display panel 110. To this end, the plurality of grating elements 211R, 211G, and 211B may have different periodic grating patterns.

Figure 3:
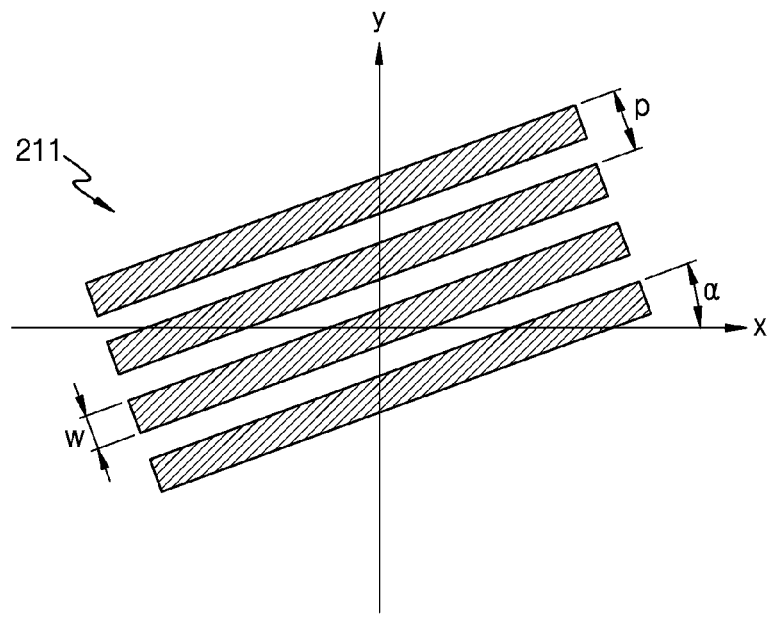
FIG. 3 is an exemplary plan view of a structure of one grating element of the curved backlight unit of FIG. 1, according to an exemplary embodiment.

For example, FIG. 3 is an exemplary plan view of a structure of one grating element 211 of the curved backlight unit 200 of FIG. 1. As shown in FIG. 3, the grating element 211 may be configured to have a grating structure of a plurality of parallel slits. The respective grating elements 211 may have intrinsic optical characteristics based on an orientation α, a pitch p, a width w, and a height h of the grating element 211 (see FIG. 2). In more detail, a wavelength, a travel direction, an intensity of light that exits from the grating element 211 may be adjusted based on the orientation α, the pitch p, the width w, and the height h of the grating elements 211. To display or output a 3D image using a non-glasses type method, since a color and a travel direction of light exited from the curved display panel 110 may differ according to 2D coordinates of the pixels 120, the orientation α, the pitch p, the width w, and the height h of the plurality of grating elements 211 may differ based on locations of the grating elements 211 on the upper surface 210a of the light guide plate 210. The grating elements 211 may be formed in a large area on the upper surface 210a of the light guide plate 210 using, for example, nano-imprinting lithography.

While the curved display apparatus 100 having the above-described structure operates in a 3D operating mode, only the first light source 220 may be turned on, and the second light source 230 may be turned off. Then, the first illumination light emitted from the first light source 220 may enter into the light guide plate 210 through the side 210b of the light guide plate 210. Thereafter, the first illumination light may be totally reflected between the upper surface 210a and the lower surface 210c of the light guide plate 210 repeatedly. While the first illumination light travels in the light guide plate 210 in this way, a part of the first illumination light may exit from the upper surface 210a of the light guide plate 210 via the grating elements 211 and may be incident on the curved display panel 110.

Figure 4:
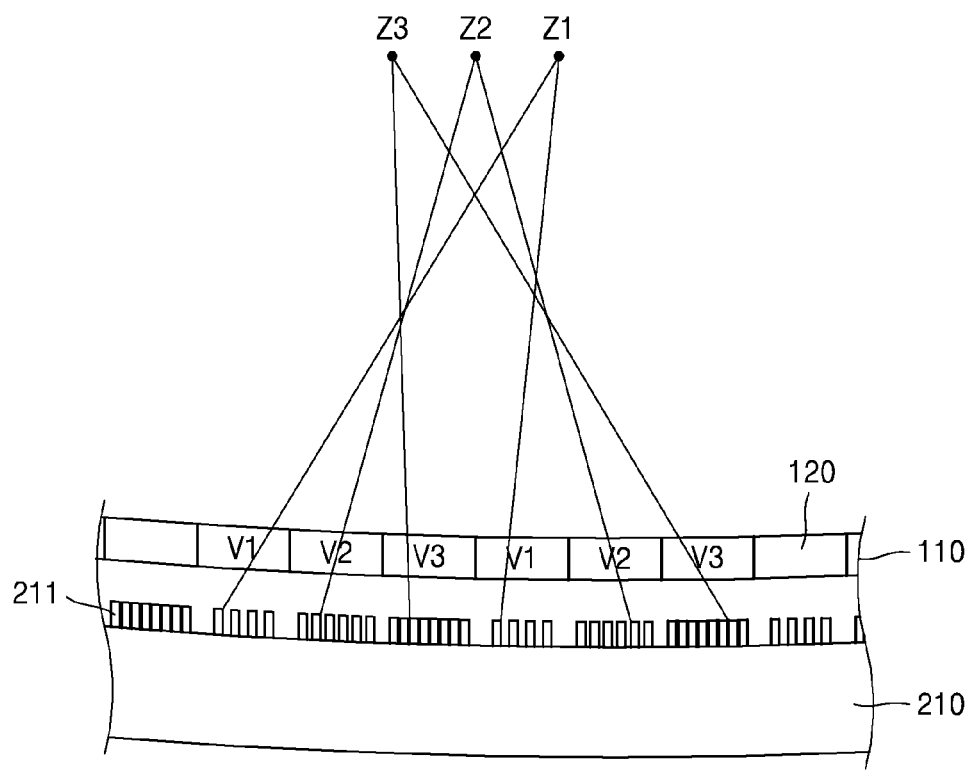
FIG. 4 is a conceptual diagram for explaining a principle in which the curved display apparatus of FIG. 1 displays a 3D image, according to an exemplary embodiment.

For example, FIG. 4 is a conceptual diagram for explaining a principle in which the curved display apparatus 100 of FIG. 1 displays a 3D image. Referring to FIG. 4, the curved display panel 110 may simultaneously display images of different viewpoints. For example, pixels V1 of the plurality of pixels 120 may display an image of a first viewpoint, pixels V2 thereof may display an image of a second viewpoint, and pixels V3 thereof may display an image of a third viewpoint. The grating elements 211 corresponding to the pixels V1 that display the image of the first viewpoint may be designed to allow first illumination light to travel toward a first viewing zone Z1. The grating elements 211 corresponding to the pixels V2 that display the image of the second viewpoint may be designed to allow the first illumination light to travel toward a second viewing zone Z2. The grating elements 211 corresponding to the pixels V3 that display the image of the third viewpoint may be designed to allow the first illumination light to travel toward a third viewing zone Z3. As described above, a travel direction of the first illumination light may be adjusted based on the orientation α, the pitch p, the width w, and the height h of the grating elements 211. Thus, the orientation α, the pitch p, the width w, and the height h of the grating elements 211 may be determined in advance so that the first illumination light may travel through viewing zones Z1, Z2, and Z3.

Then, images of different viewpoints may be seen in the three viewing zones Z1, Z2, and Z3. For example, if an observer's left eye is located in the first viewing zone Z1 and an observer's right eye is located in the second viewing zone Z2, a 3D image of a first parallax may be seen. If the observer's left eye is located in the second viewing zone Z2 and the observer's right eye is located in the third viewing zone Z3, a 3D image of a second parallax may be seen. The curved display panel 110 exemplarily displays an image of three viewpoints in FIG. 4 but the exemplary embodiments are not limited thereto. For example, the curved display panel 110 may be configured to display an image of only two viewpoints or an image of more than four viewpoints.

While the curved display apparatus 100 operates in the 2D image mode, the curved display panel 110 may display one image of the same viewpoint. The first light source 220 may be turned off. The second light source 230 may be turned on. The second illumination light emitted from the second light source 230 may pass through the lower surface 210c and the upper surface 210a of the light guide plate 210 and may be incident on the curved display panel 110. To this end, the grating elements 211 may be designed to have no influence on the second illumination light. For example, the grating elements 211 may be designed to diffract light that is incident on the upper surface 210a of the light guide plate 210 at an angle larger than a critical angle and transmit light that is perpendicularly incident on the upper surface 210a of the light guide plate 210 without a diffraction.

As described above, the curved display apparatus 100 according to the present exemplary embodiment may be switched between a 3D image mode and a 2D image mode using the curved backlight unit 200 that provides illumination light in an edge type manner in the 3D image mode and provides illumination light in a direct type manner in the 2D image mode. The curved display panel 110 and the light guide plate 210 are curved, thereby providing an image having a small distortion and a strong concentration.

However, if the curved display panel 110 is curved to have a curvature, a front portion of the curved display panel 110 in which a color filter is located in relation to a center portion of the curved display panel 110 may be compressed, and a back portion thereof in which a liquid crystal cell and a driving circuit are located may be elongated. Thus, a light leakage phenomenon may occur in specific areas of the curved display panel 110 due to interactions between a plurality of spacers that partition the plurality of pixels 120 of the curved display panel 110 and interactions between other components of the curved display panel 110 and the spacers. The areas in which the light leakage phenomenon occurs may not effectively block illumination light from the curved backlight unit 200 when the curved display panel 110 displays an image of a black or dark color (i.e., no driving voltage is applied to the liquid crystal cell), and thus, the areas may be brighter than other areas. Therefore, brightness of the curved display panel 110 may not be uniform on an entire screen.

Figure 5:
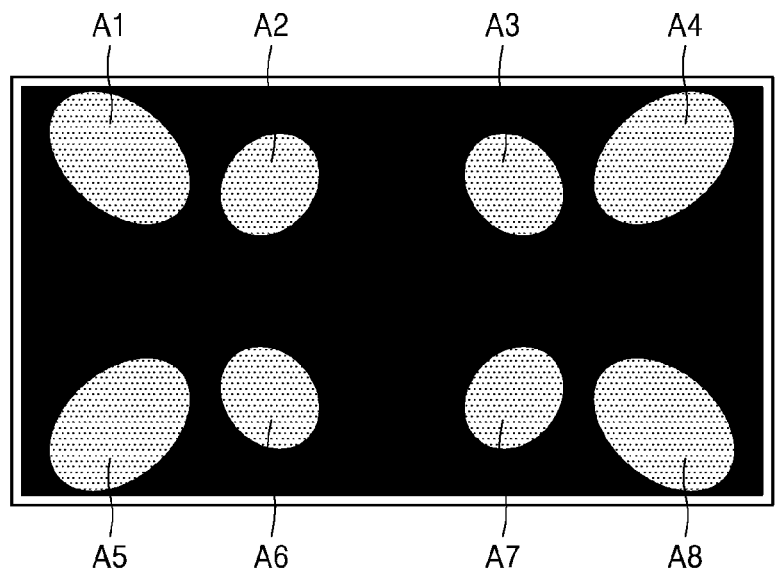
FIG. 5 is an exemplary plan view of a plurality of light leakage areas of the curved display panel in which a light leakage phenomenon occurs.

For example, FIG. 5 is an exemplary plan view of a plurality of light leakage areas A1 through A8 of the curved display panel 110 of FIG. 1 in which a light leakage phenomenon occurs. Although the light leakage areas A1 through A8 of the curved display panel 110 are vertically symmetrical with respect to each other in FIG. 5, the light leakage areas A1 through A8 may be irregular. The light leakage areas A1 through A8 of the curved display panel 110 may be brighter than other areas with respect to images of the same brightness and may have different brightness according to locations thereof.

To compensate for non-uniform brightness caused by the light leakage areas A1 through A8, the curved backlight unit 200 may reduce an intensity of first and second illumination light provided by the light leakage areas A1 through A8 compared to an intensity of first and second illumination light provided by other areas of the curved display panel 110. To this end, the light guide plate 210 may be configured to include a plurality of areas having different exit light intensity of the first and second illumination light. In particular, because the first illumination light may be provided to the light guide plate 210 by the first light source 220 in an edge type manner and the second illumination light may be provided to the light guide plate 210 by the second light source 230 in a direct type manner, the intensity of the first and second illumination light may be adjusted in different ways.

Figure 6:
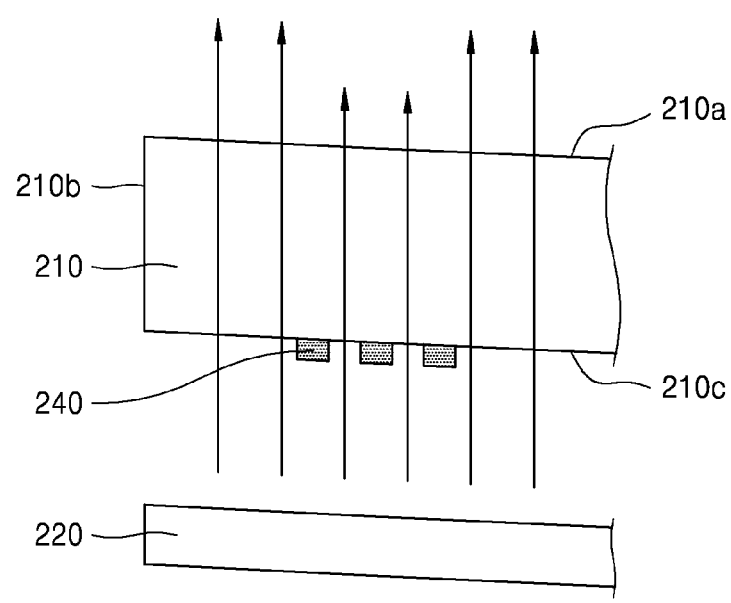
FIG. 6 is an exemplary cross-sectional view of a light blocking member for reducing an amount of illumination light in light leakage areas in which a light leakage phenomenon occurs, according to an exemplary embodiment.

The second illumination light for a 2D image may not be influenced by the grating elements 211 since the second illumination light is provided by the light guide plate 210 in the direct type manner. Thus, a separate structure for reducing an amount of the second illumination light in the light leakage areas A1 through A8 may be installed in the light guide plate 210. For example, FIG. 6 is an exemplary cross-sectional view of a light blocking member 240 for reducing an amount of second illumination light in the light leakage areas A1 through A8 in which a light leakage phenomenon occurs. Referring to FIG. 6, the light blocking member 240 may be partially disposed on the lower surface 210c of the light guide plate 210. The light blocking member 240 may be disposed to face the light leakage areas A1 through A8 to partially absorb, reflect, or scatter the second illumination light. For example, the light blocking member 240 may be formed of a metal material that has an excellent reflectivity with respect to visible light and is not transformed due to heat and light such as aluminum, silver, brass, steel use stainless (SUS), etc. In this case, the light blocking member 240 may be formed on the lower surface 210c of the light guide plate 210 by sputtering or imprinting. When the light blocking member 240 reflects light, light reflected from the light blocking member 240 may be reused by reflecting the light to a mirror may be disposed on a lower portion of the second light source 230. The light blocking member 240 may be formed of an opaque dielectric material that absorbs light such as a black dye, carbon black, graphene, etc.

The light blocking member 240 may not wholly but partially block the second illumination light in the light leakage areas A1 through A8 to reduce intensity of the second illumination light. Thus, the light blocking member 240 may be formed to have a predetermined pattern through which a part of the second illumination light may pass. For example, FIGS. 7A through 7E are exemplary plan views of various patterns of the light blocking member 240 of FIG. 6.

Figure 7A:
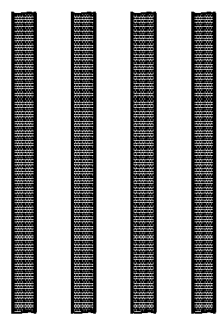
FIGS. 7A through 7E are exemplary plan views of various patterns of the light blocking member of FIG. 6, according to an exemplary embodiment.
Figure 7B:
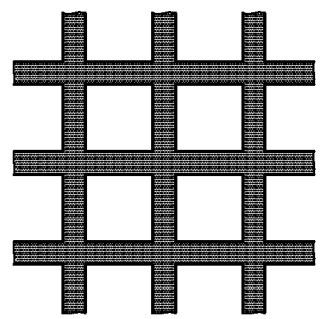
Figure 7C:
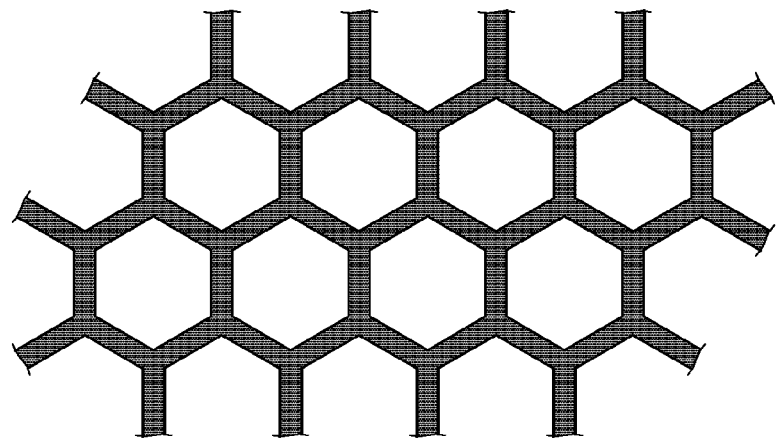
Figure 7D:
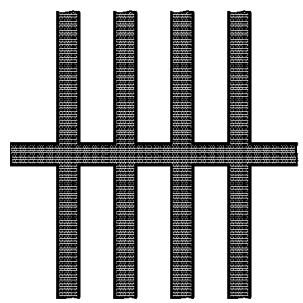
Figure 7E:
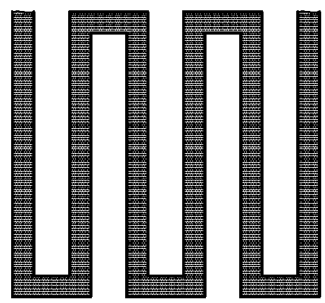

As shown in FIG. 7A, the light blocking member 240 may have a parallel line grating pattern in which a plurality of bars are arranged in parallel to each other. Although the light blocking member 240 of FIG. 7A may have the similar pattern as that of the grating element 211 of FIG. 3, the grating element 211 of FIG. 3 may have a very small size of several tens and hundreds nm, whereas the light blocking member 240 may have a size that can be seen by naked eyes. As shown in FIG. 7B, the light blocking member 240 may have a matrix or mesh grating pattern in which rectangular 2D gratings are arranged. As shown in FIG. 7C, the light blocking member 240 may have a honeycomb pattern in which hexagonal gratings are arranged. As shown in FIG. 7D, the light blocking member 240 may have a fish bone pattern. As shown in FIG. 7E, the light blocking member 240 may have a winding serpentine pattern. The light blocking member 240 may also have various other patterns.

A degree of blocking the second illumination light by the light blocking member 240 may be adjusted by adjusting a density of a part of various patterns that reflect or absorb light. Since the light leakage areas A1 through A8 may have different degrees of light leakage, the light blocking member 240 may be designed to have different blocking degrees of the second illumination light according to degrees of light leakage of the light leakage areas A1 through A8. The light blocking member 240 may reduce intensity of the second illumination light that is incident on the light leakage areas A1 through A8. That is, a smaller amount of the second illumination light may be provided to the light leakage areas A1 through A8 than those of other areas. As a result, in a 2D image mode, the curved display panel 110 may emit light of uniform intensity from an entire area thereof. Thus, a viewer may perceive that a light leakage phenomenon is reduced. In particular, the light leakage phenomenon may be reduced in the same way with respect to a dark image and a bright image.

Figure 8:
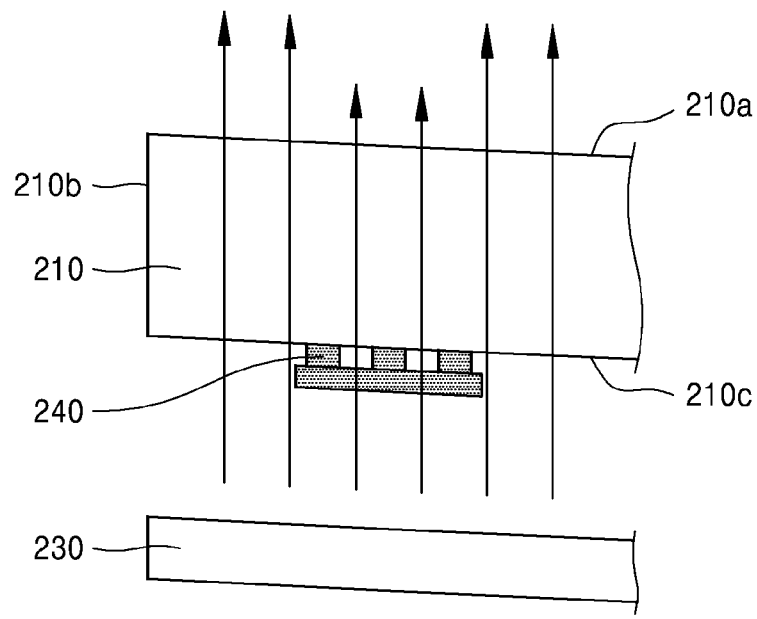
FIG. 8 is an exemplary cross-sectional view of a light blocking member according to another exemplary embodiment.

FIG. 8 is an exemplary cross-sectional view of the light blocking member 240 according to another exemplary embodiment. The light blocking member 240 of FIG. 6 is configured to have a single layer structure, whereas the light blocking member 240 of FIG. 8 is configured to have a multilayer structure. For example, various patterns shown in FIGS. 7A through 7E may be stacked more than two layers several times. Alternatively, for example, horizontal lines may be disposed on lower layers, and vertical lines may be stacked on the horizontal lines, and thus the patterns shown in FIGS. 7A through 7E may be formed.

Figure 9:
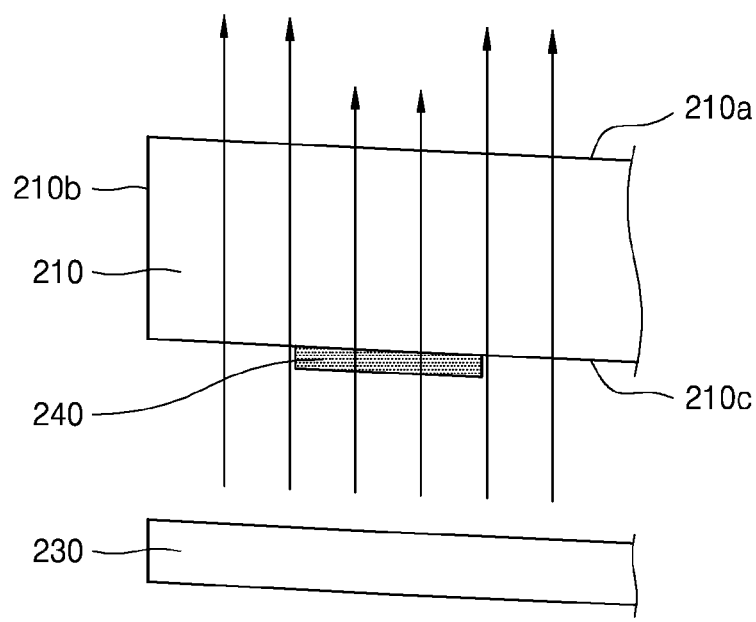
FIG. 9 is an exemplary cross-sectional view of a light blocking member according to another exemplary embodiment.

FIG. 9 is an exemplary cross-sectional view of the light blocking member 240 according to another exemplary embodiment. Although the light blocking member 240 has various patterns to partially block the second illumination light in FIGS. 7A through 7E, as shown in FIG. 9, a semi-transparent film that transmits a part of incident light and absorbs or reflects the other part of the incident light may be used as the light blocking member 240. When the semi-transparent film is used as the light blocking member 240, the light blocking member 240 may select different transmittance of the semi-transparent film with respect to the light leakage areas A1 through A8.

Figure 10:
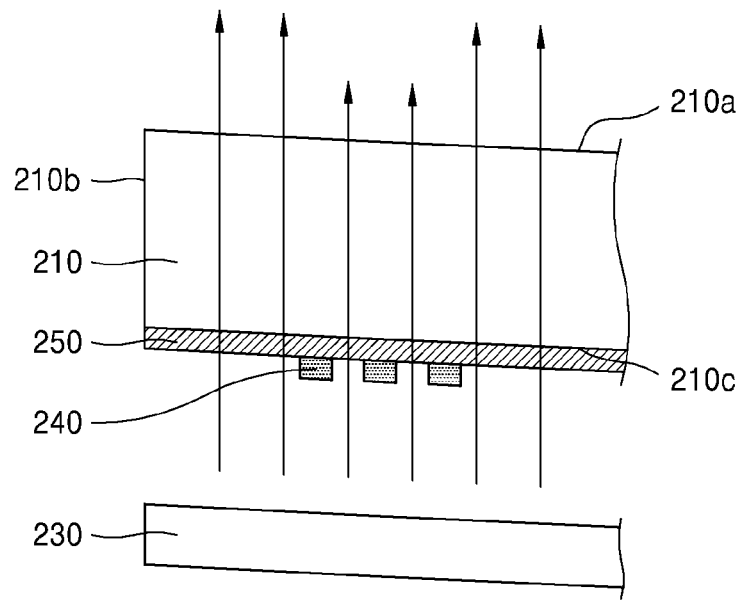
FIG. 10 is an exemplary cross-sectional view of a transparent coating layer disposed between a light guide plate and a light blocking member, according to an exemplary embodiment.

The light blocking member 240 may influence a total reflection of the first illumination light in the lower surface 210c of the light guide plate 210 according to a refractive index of the light blocking member 240. For example, an angle of the first illumination light that is totally reflected may be changed or a part of the first illumination light may be lost in an area in which the light blocking member 240 is located. Thus, a transparent coating layer may be further disposed between the lower surface 210c of the light guide plate 210 and the light blocking member 240 such that the light blocking member 240 may not influence the total reflection of the first illumination light. For example, FIG. 10 is an exemplary cross-sectional view of a transparent coating layer 250 disposed between the light guide plate 210 and the light blocking member 240. If the transparent coating layer 250 is disposed, since the first illumination light is totally reflected from an interface between the light guide plate 210 and the transparent coating layer 250, the first illumination light may not be influenced by the light blocking member 240. A refractive index of the transparent coating layer 250 may be smaller than that of the light guide plate 210 such that the first illumination light may be totally reflected from the interface between the light guide plate 210 and the transparent coating layer 250.

Figure 11:
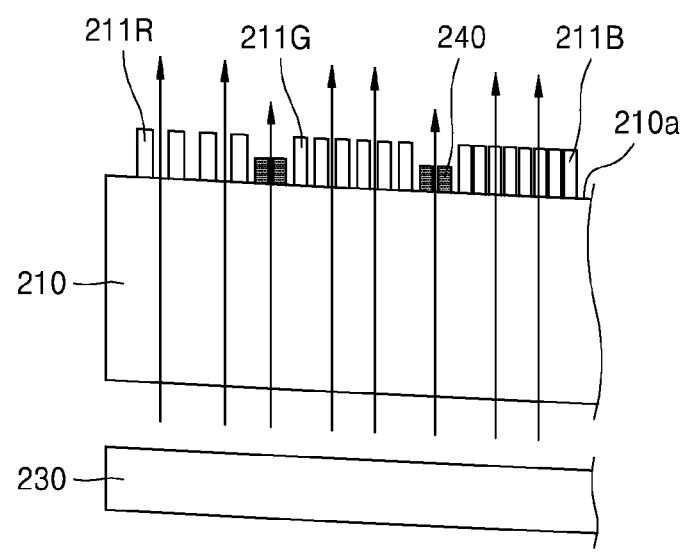
FIG. 11 is an exemplary cross-sectional view of a light blocking member according to another exemplary embodiment.

FIG. 11 is an exemplary cross-sectional view of the light blocking member 240 according to another exemplary embodiment. Although it is described above that the light blocking member 240 is disposed on the lower surface 210c of the light guide plate 210, as shown in FIG. 11, the light blocking member 240 may be disposed on the upper surface 210a of the light guide plate 210. The plurality of grating elements 211 may also be disposed on the upper surface 210a of the light guide plate 210, and thus the light blocking member 240 may be disposed by avoiding the plurality of grating elements 211. The plurality of grating elements 211 may not be disposed on the upper surface 210a of the light guide plate 210 corresponding to the black matrix BM of the curved display panel 110. In general, spaces between the plurality of grating elements 211 may be greater than a width of the black matrix BM. Thus, the light blocking member 240 may be disposed between the plurality of grating elements 211 in the upper surface 210a of the light guide plate 210. The light blocking member 240 may be disposed on both the lower surface 210c and the upper surface 210a of the light guide plate 210.

First illumination light for a 3D image is provided to the light guide plate 210 in an edge type manner, and thus the first illumination light may be influenced by the grating elements 211. As described above, a wavelength, a travel direction, intensity of light that exits from the grating elements 211 may be adjusted based on the orientation α, the pitch p, the width w, and the height h of the grating elements 211. Thus, an amount of the first illumination light discharged from the grating elements 211 may be greatly influenced by the width w and the height h of the grating elements 211.

Figure 12:
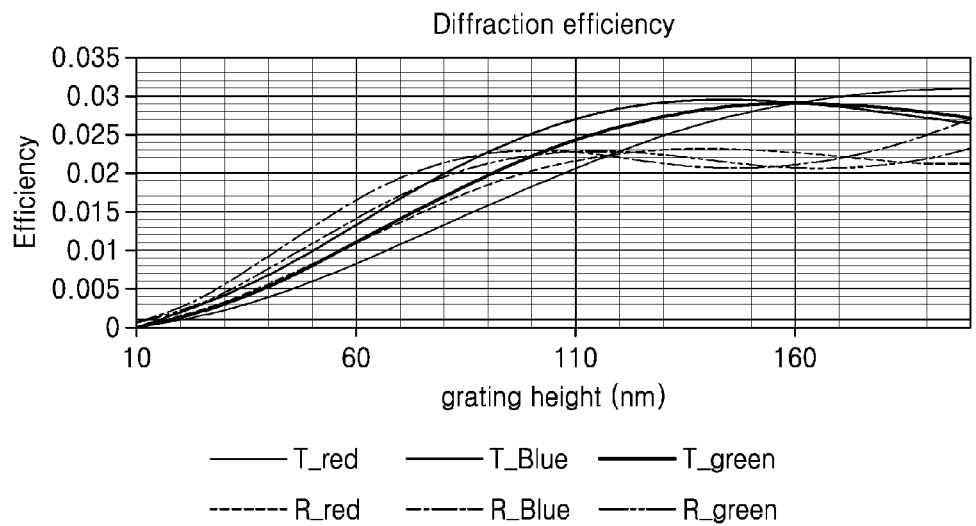
FIG. 12 is an exemplary graph of diffraction efficiency with respect to heights of grating elements, according to an exemplary embodiment.

For example, FIG. 12 is an exemplary graph of diffraction efficiency with respect to heights of the grating elements 211. In the graph of FIG. 12, solid lines indicate diffraction efficiency of transmission light, and broken lines indicate diffraction efficiency of reflection light. As shown in the graph of FIG. 12, the greater the heights of the grating elements 211, the generally higher the diffraction efficiency of the transmission light. Thus, the heights h of the grating elements 211 of the light leakage areas A1 through A8 may be lower than those of the grating elements 211 of other areas. The light leakage areas A1 through A8 may have different degrees of light leakage, and thus the heights h of the grating elements 211 may be adjusted according to the degrees of light leakage of the leakage areas A1 through A8. For example, as the degrees of light leakage of the leakage areas A1 through A8 increase, the heights h of the grating elements 211 may be designed to be lower.

Figure 13:
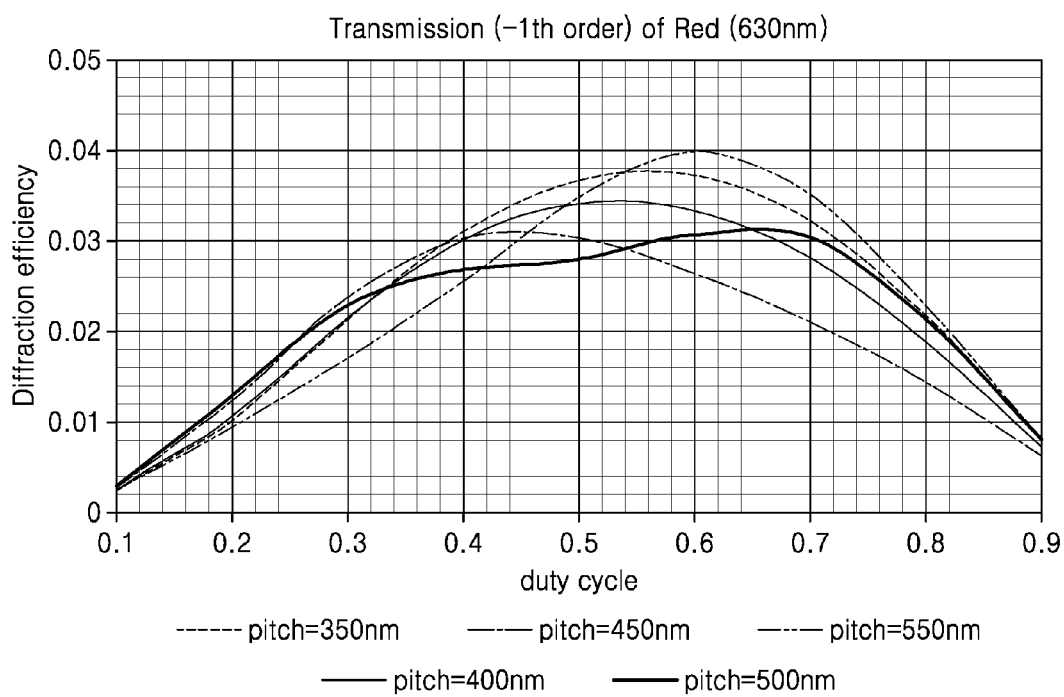
FIGS. 13 through 15 are exemplary graphs of diffraction efficiency with respect to duty cycles of grating elements for each color, according to an exemplary embodiment.
Figure 14:
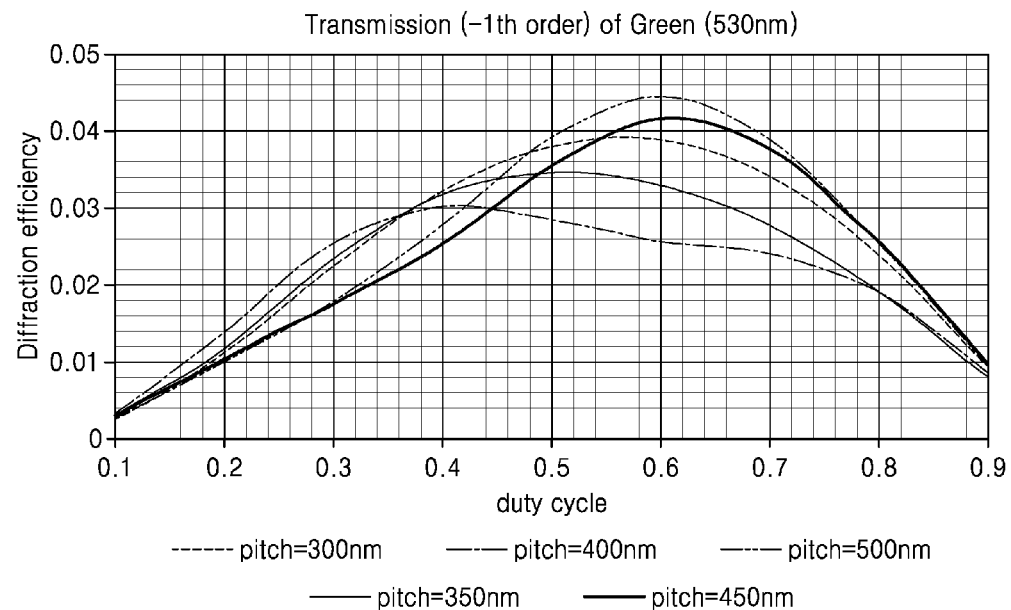
Figure 15:
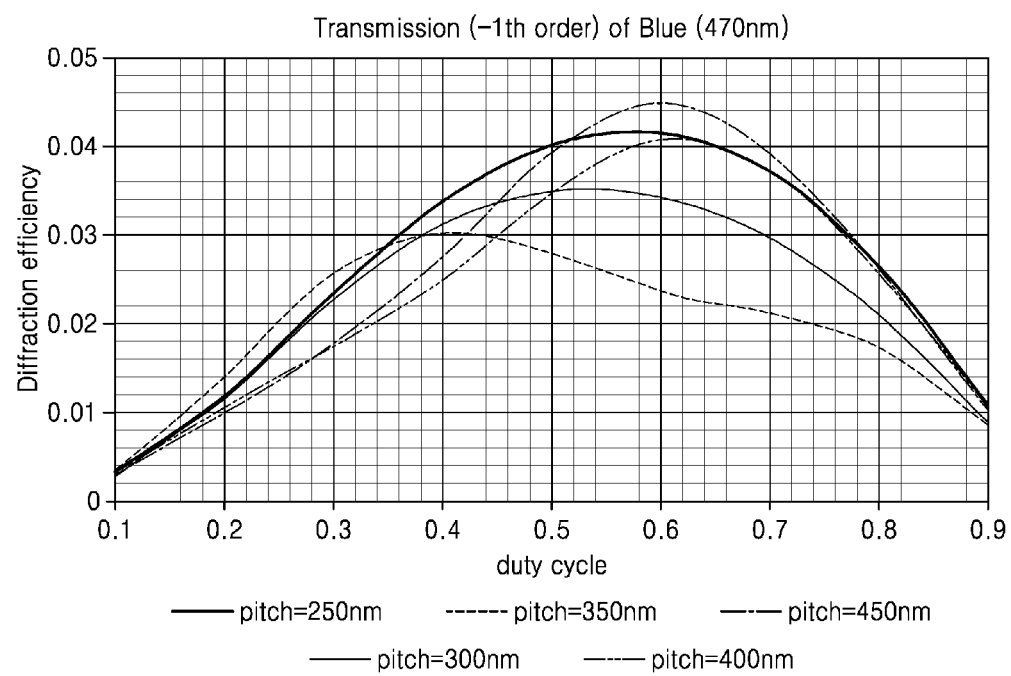

FIGS. 13 through 15 are exemplary graphs of diffraction efficiency with respect to duty cycles of the grating elements 211 for each color. FIG. 13 shows diffraction efficiency of red light. FIG. 14 shows diffraction efficiency of green light. FIG. 15 shows diffraction efficiency of blue light. In this regard, the duty cycles of the grating elements 211 may mean a ratio w/p of the pitch p and the width w. Referring to the graphs of FIGS. 13 through 15, although the duty cycles are slightly different according to a color of a first illumination light and the pitch p of the grating elements 211, a diffraction efficiency of the grating elements 211 may be the highest in the range of about 0.4 through about 0.7 of the duty cycles. As the duty cycles of the grating elements 211 are closer to 0.1 from 0.4 or closer to 0.9 from 0.7, the diffraction efficiency of the grating elements 211 may be rapidly reduced.

Therefore, the duty cycles of the grating elements 211 of the light leakage areas A1 through A8 may be appropriately selected according to degrees of light leakage of the light leakage areas A1 through A8 within the range approximately between 0.1 and 0.4 or between 0.7 and 0.9. For example, when the degrees of light leakage of the light leakage areas A1 through A8 increase, the duty cycles of the grating elements 211 of the light leakage areas A1 through A8 may be selected closer to 0.1 or 0.9, and when the degrees of light leakage of the light leakage areas A1 through A8 decrease, the duty cycles of the grating elements 211 of the light leakage areas A1 through A8 may be selected smaller than and closer to 0.4 or greater than and closer to 0.7. The duty cycles of the grating elements 211 of areas other than the light leakage areas A1 through A8 may be selected within the range approximately between 0.4 and 0.7. In this regard, the duty cycles in areas other than the light leakage areas A1 through A8 may be differently selected within the range approximately between 0.4 and 0.7 according to the grating elements 211 such that red light, green light, and blue light having uniform intensity may be exited by the plurality of grating elements 211 in the entire areas other than the light leakage areas A1 through A8.

As described above, intensity of the first illumination light may be adjusted according to a combination of the height h of the grating elements 211 and the duty cycle w/p. That is, a smaller amount of the first illumination may be provided to the light leakage areas A1 through A8 than that of other areas. As a result, in a 3D image mode, the curved display panel 110 may emit from an entire area thereof light of uniform intensity. Thus, a viewer may perceive that a light leakage phenomenon is reduced. In particular, the light leakage phenomenon may be reduced in the same way with respect to a dark image and a bright image.

As described above, according to the present exemplary embodiment, the intensity of the first illumination light for the 3D image may be adjusted using the plurality of grating elements 211 formed on the upper surface 210a of the light guide plate 210, and the intensity of the second illumination light for the 2D image may be adjusted using the light blocking member 240 that partially reflects or absorbs light. Thus, the light leakage phenomenon may be reduced with respect to both the 3D image and the 2D image.

The curved display panel 110 of the curved display apparatus 100 may be a bendable panel capable of changing a curvature. However, if the curvature of the curved display panel 110 is changed, locations of the light leakage areas A1 through A8 may also be changed. Thus, the intensity of the first and second illumination light may be actively adjusted in correspondence with a change in the locations of the light leakage areas A1 through A8. For example, the light blocking member 240 or the grating elements 211 may be configured to actively control the change in the locations of the light leakage areas A1 through A8.

Figure 16A:
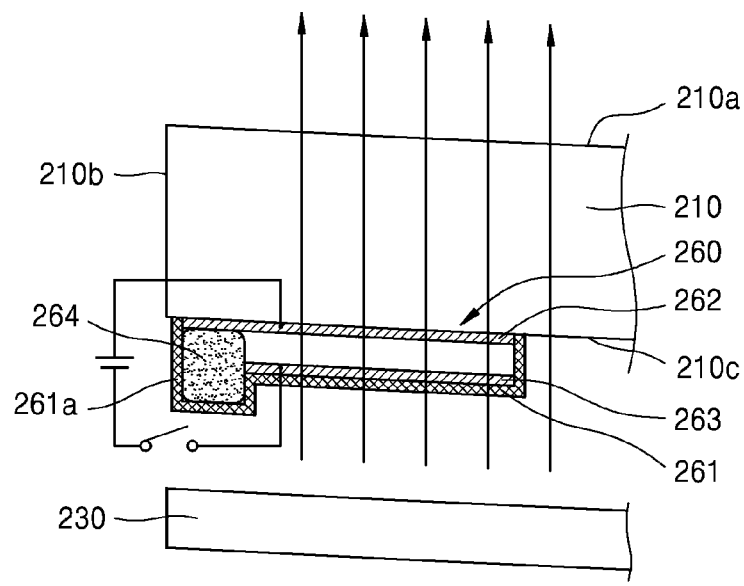
FIGS. 16A and 16B are exemplary cross-sectional views of a light blocking member configured to actively correspond to a change in locations of light leakage areas with respect to a change in a curvature of a curved display panel, according to an exemplary embodiment.
Figure 16B:
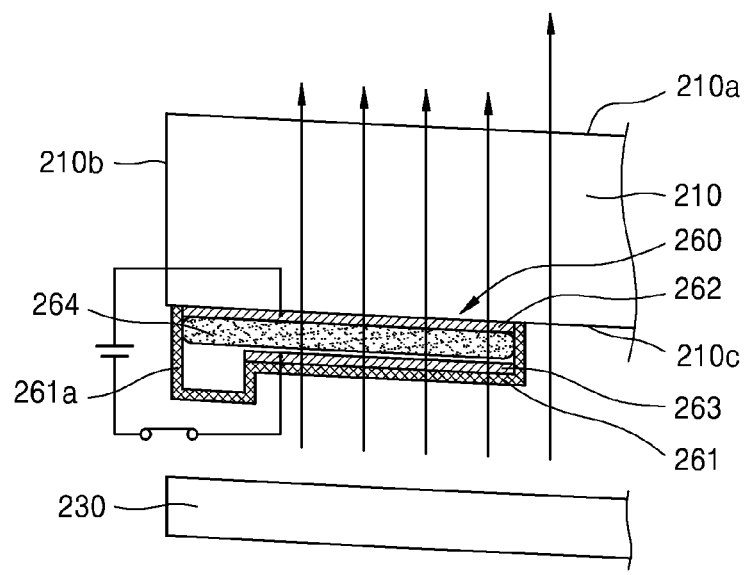

FIGS. 16A and 16B are exemplary cross-sectional views of a light blocking member 260 configured to actively correspond to a change in locations of the light leakage areas A1 through A8 with respect to a change in a curvature of the curved display panel 110. Although the light blocking member 240 described above does not change transmittance of second illumination light, the light blocking member 260 according to the present exemplary embodiment may actively control the transmittance of second illumination light by using an electrowetting phenomenon. Referring to FIGS. 16A and 16B, the light blocking member 260 may include a first transparent electrode 262 disposed on the lower surface 210c of the light guide plate 210, a second transparent electrode 263 disposed to face the first transparent electrode 262, liquid droplets 264 movable according to a voltage between the first transparent electrode 262 and second transparent electrode 263, and a chamber 261 that seals the liquid droplets 264. For example, the applied voltage between the first transparent electrode 262 and second transparent electrode 263 causes the liquid droplets 264 to move due to the droplets being attracted to the first transparent electrode 262. The chamber 261 may include a reserve unit 261a (e.g., a reserve chamber, reservoir, etc.) that stores the liquid droplets 264 and may be disposed in an edge of the light guiding plate 210 so that the second illumination light does not pass though.

Due to a small surface energy, the liquid droplets 264 may have an excellent motion according an electric signal and may include a mixture material such as, but not necessarily limited to, fluorocarbon, silicon, etc. The liquid droplets 264, such as liquid crystal droplets, may block at least partially light. An additive for adjusting light transmittance may be further mixed with the liquid droplets 264. Hydrophobic or hydrophilic processing may be performed on a surface of the first transparent electrode 262 or the second transparent electrode 263 as necessary.

In such a structure, when no voltage is applied to the first transparent electrode 262 and the second transparent electrode 263, as shown in FIG. 16A, the liquid droplets 264 may be pushed to one corner of the first transparent electrode 262 and collected in the reserve unit 261a of the chamber 261. Then, the second illumination light emitted from the second light source 230 may pass through the light blocking member 260 with little loss. When the voltage is applied to the first transparent electrode 262 and the second transparent electrode 263, as shown in FIG. 16B, the liquid droplets 264 may be electrically attracted to the first transparent electrode 262 and uniformly distributed on the first transparent electrode 262. In this case, only a part of the second illumination light may pass through the light blocking member 260. Thus, the amount of the second illumination light may be reduced in an area in which the light blocking unit 260 is located compared to other areas.

As described above, the transmittance of the light blocking member 260 may be electrically adjusted by the electrowetting phenomenon. Thus, the transmittance of the light blocking member 260 may actively correspond to a change in degrees of light leakage of the light leakage areas A1 through A8. Although not shown in FIGS. 16A and 16B, the chamber 261 may have various patterns. For example, the chamber 261 may various patterns shown in FIGS. 7A through 7E.

According to the present exemplary embodiment, the plurality of chambers 261 and the plurality of first and second transparent electrodes 262 and 263 may be formed in each of a plurality of candidate areas in which the light leakage areas A1 through A8 may be present, and the chambers 261 may be respectively connected to the reserve units 261a through a path through which the liquid droplets 262 may move such as a micro-channel. Then, the liquid droplets 264 may be supplied to a desired place without any limitations of locations. Thus, the light leakage areas A1 through A8 having a uniformity problem due to a curvature diameter of the curved display panel 11 may be selectively darkened, and the intensity of the second illumination light may be actively controlled in correspondence to the change in locations of the light leakage areas A1 through A8.

Figure 17:
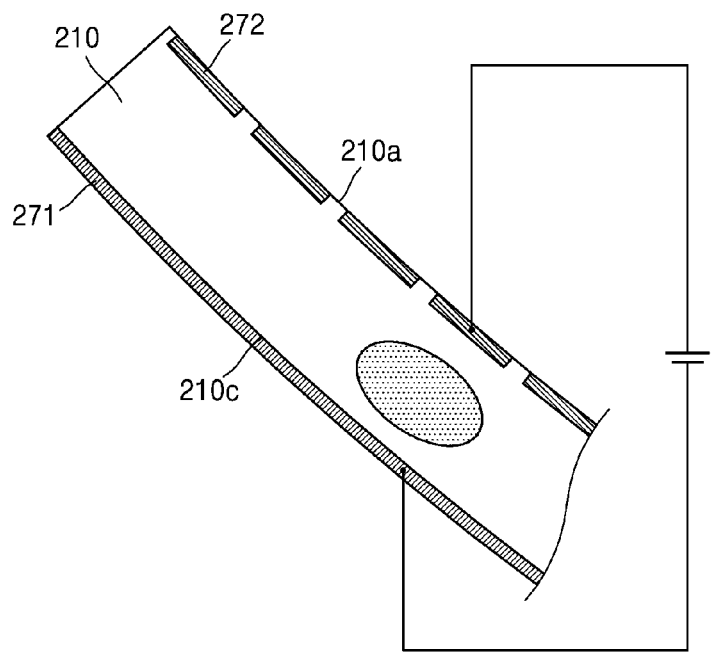
FIGS. 17 and 18 are exemplary cross-sectional views of a structure of a light guide plate configured to actively correspond to a change in locations of light leakage areas with respect to a change in a curvature of a curved display panel, according to an exemplary embodiment.
Figure 18:
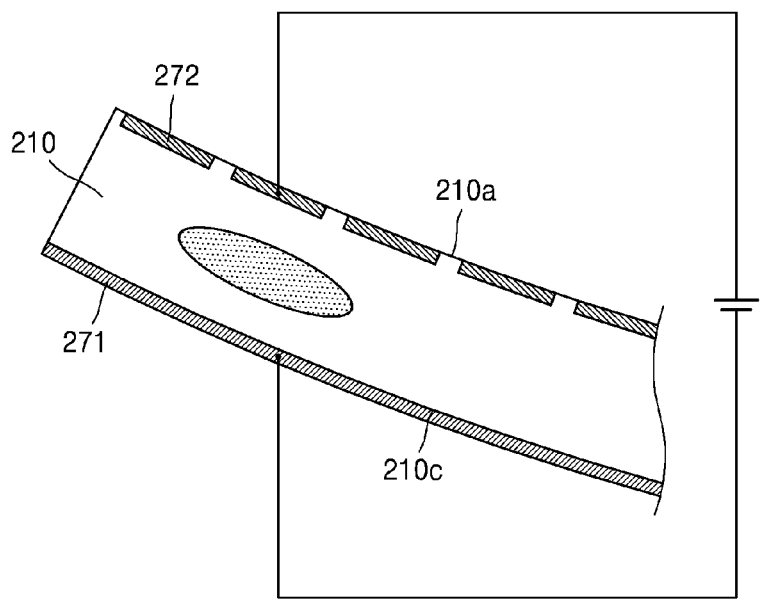

FIGS. 17 and 18 are exemplary cross-sectional views of a structure of the light guide plate 210 configured to actively correspond to a change in locations of the light leakage areas A1 through A8 with respect to a change in a curvature of the curved display panel 110. Referring to FIGS. 17 and 18, the curved display apparatus 100 may include a first transparent electrode 271 disposed on the lower surface 210c of the light guide plate 210 and a second transparent electrode 272 disposed on the upper surface 210a of the light guide plate 210. The first transparent electrode 271 may be a common electrode disposed on the entire lower surface 210c of the light guide plate 210. The second transparent electrode 272 disposed on the upper surface 210a of the light guide plate 210 may include a 2D array of a plurality of patterns. For example, the plurality of patterns of the second transparent electrode 272 may respectively correspond to the pixels 120 of the curved display panel 110. However, the plurality of patterns of the second transparent electrode 270 may not be as small as the size of the pixels 120. If a voltage may be locally applied to the upper surface 210a of the light guide plate 210 in correspondence with the change in the locations of the light leakage areas A1 through A8, sizes of the patterns of the second transparent electrode 272 are not particularly limited and may not be necessarily the same. The patterns of the second transparent electrode 272 may not be necessarily arranged in the entire upper surface 210a of the light guide plate 210 and may be disposed only in candidate areas in which the light leakage areas A1 through A8 may be present.

In such a structure, as shown in FIGS. 17 and 18, if the locations of the light leakage areas A1 through A8 are changed according to a change in curvatures of the light guide plate 210 and the curved display panel 110, a voltage may be applied to the patterns of the second transparent electrode 272 in locations corresponding to the light leakage areas A1 through A8. Then, current flows in the patterns of the second transparent electrode 272 to which the voltage is applied, and thus a temperature of the light guide plate 210 may locally increase. Such an increase in the temperature may cause a change in sizes of the plurality of grating elements 211 disposed on the upper surface 210a of the light guide plate 210. For example, an increase in temperatures of the grating elements 211 may cause an increase in heights and widths of the grating elements 211. Thus, an opening may be reduced due to a change in a duty cycle caused by such a size change, thereby reducing light transmittance.

The temperature increase in the grating elements 211 may depend on various factors such as a current applied to the first and second transparent electrodes 271 and 272, a resistance of the first and second transparent electrodes 271 and 272, etc., and may generally follow a behavior based on a Joule heating phenomenon according to Equation 1 below.

$$H \propto I^2 R t \qquad [\text{Equation 1}]$$

In equation 1, I denotes the current applied to the first and second transparent electrodes 271 and 272, R denotes the resistance of the first and second transparent electrodes 271 and 272, and t denotes a period of time when the current flows through the first and second transparent electrodes 271 and 272.

Refractive indices of the grating elements 211 may be changed by increasing the temperatures thereof, and thus the light transmittance may also be adjusted. In general, the grating elements 211 may preferably have a structure known as a sub-wavelength grating (SWG) having a period less that that of a light wavelength. Since a light reflectivity may be determined by using the Fresnel equation as shown in Equation 2 below, if the refractive indices of the grating elements 211 are changed by increasing the temperatures of the grating elements 211, the light transmittance of a part in which the grating elements 211 are disposed may be adjusted.

$$R = \left(\frac{n_1 - n_2}{n_1 + n_2}\right)^2 \qquad [\text{Equation 2}]$$

In Equation 2, $n_1$ denotes a refractive index of air and $n_2$ denotes a refractive index of a material of the grating elements 211. The refractive index $n_1$ of air is constant and equal to 1, and thus the reflectivity R may be adjusted by adjusting the refractive index $n_2$ of the material of the grating elements 211. In general, when the grating elements 211 include a material having a high refractive index, light may be scattered, which makes it difficult for light to travel. Thus, a phenomenon that the refractive indices of the grating elements 211 increase according to a temperature increase may be used to adjust the light transmittance of the part in which the grating elements 211 are located. In general, a refractive index n(T) of a SWG material at a specific temperature T may increase proportional to the temperature increase and may be described via a relation as shown by Equation 3 below.

$$n(T) \approx n(T_0)(1 + \alpha \Delta T) \qquad [\text{Equation 3}]$$

In Equation 3, $T_0$ denotes a reference temperature, T denotes a temperature of the SWG material adjusted by a heating element, and α denotes a linear temperature coefficient (dn/dT), i.e., an inclination.

Figure 19A:
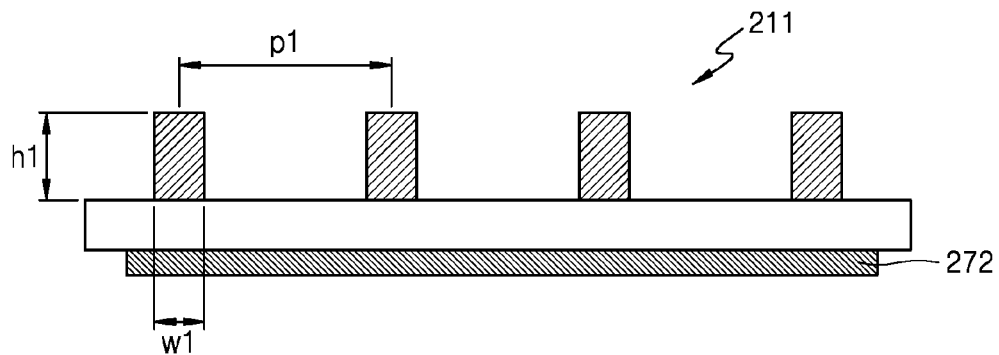
FIGS. 19A and 19B are cross-sectional views of an example in which shapes of grating elements are changed according to a voltage applied to a transparent electrode of a light guide plate, according to an exemplary embodiment.
Figure 19B:
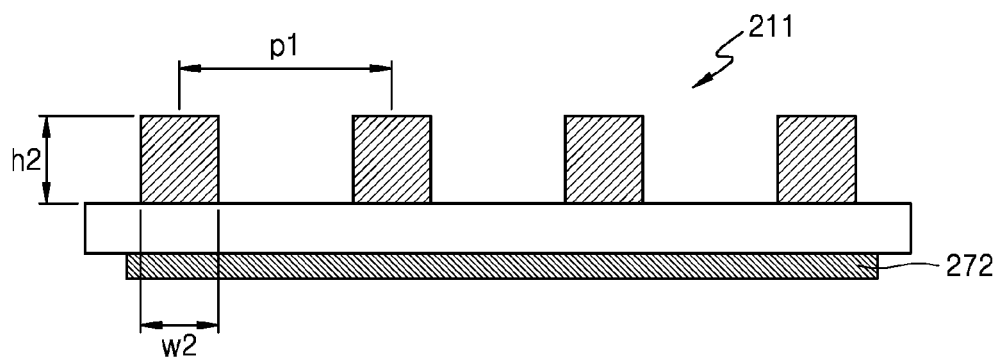

FIGS. 19A and 19B are cross-sectional views of an example in which shapes of the grating elements 211 are changed according to a voltage applied to the second transparent electrode 272 of the light guide plate 210. FIG. 19A shows a case where no voltage is applied to the second transparent electrode 272. FIG. 19B shows a case where a voltage is applied to the second transparent electrode 272. When no voltage is applied to the second transparent electrode 272, the grating elements 211 may have a height h1 and a width w1. When the voltage is applied to the second transparent electrode 272, if a temperature of the light guide plate 210 locally increases, the grating elements 211 may have a height h2 and a width w2 in an area in which the temperature increases. However, the grating elements 211 may have uniform pitch p1. As described above, intensity of first illumination light may be adjusted according to a combination of the height h and the duty cycle w/p of the grating elements 211. Thus, if the voltage is applied to the second transparent electrode 272 in correspondence with a change in locations of the light leakage areas A1 through A8, since the height h and the duty cycle w/p of the grating elements 211 are changed, an amount of the first illumination light provided to the light leakage areas A1 through A8 may be adjusted.

To this end, the grating elements 211 may be formed of a transparent material having a big change in a refractive index with respect to a temperature or a transparent material having a high expansion or contraction level with respect to the temperature. For example, the grating elements 211 may be formed of an inorganic material such as a silicon oxide ($SIO_2$), an aluminum oxide ($A_2O_3$), a silicon nitride (SiNx), etc. The grating elements 211 that is formed of the material having the big change in the refractive index with respect to the temperature or the material having the high expansion or contraction level with respect to the temperature may not be necessarily arranged in the entire upper surface 210a of the light guide plate 210, like the second transparent electrode 272, and may be disposed only in candidate areas in which the light leakage areas A1 through A8 may be present. The grating elements 211 may use a material having a refractive index varying with respect to a voltage.

Figure 20:
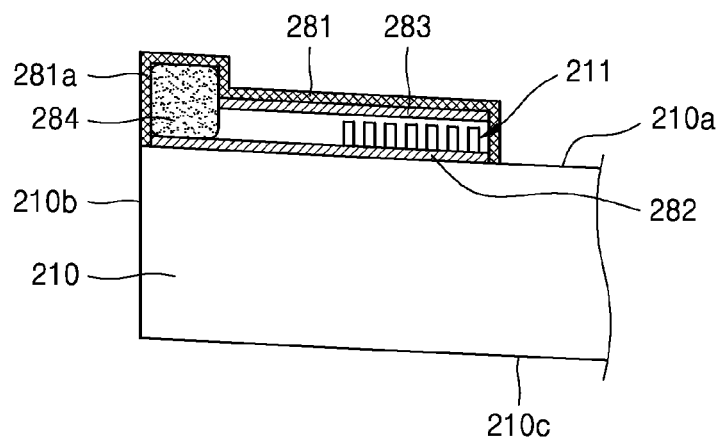
FIG. 20 is a cross-sectional view schematically showing a structure for adjusting light transmittance of grating elements using an electrowetting phenomenon, according to an exemplary embodiment.

An electrowetting phenomenon described with reference to FIGS. 16 and 16B may be used to adjust light transmittance of the part in which the grating elements 211 are located. For example, FIG. 20 is a cross-sectional view schematically showing a structure for adjusting light transmittance of the grating elements 211 using the electrowetting phenomenon. Referring to FIG. 20, the curved backlight unit 200 may include a first transparent electrode 282 disposed on the upper surface 210a of the light guide plate 210, a second transparent electrode 283 disposed to face the first transparent electrode 282, liquid droplets 284 movable according to a voltage between the first transparent electrode 282 and second transparent electrode 283, and a chamber 281 that seals the liquid droplets 284. The chamber 281 may include a reserve unit 281a that stores the liquid droplets 284 and may be disposed in an edge of the light guiding plate 210 so that the first illumination light does not pass through. The grating elements 211 may be disposed on the first transparent electrode 282 in the chamber 281. The liquid droplets 284 may include a material having a refractive index same as or similar to that of the grating elements 211.

In such a structure, when no voltage is applied to the first transparent electrode 282 and the second transparent electrode 283, the liquid droplets 284 may be pushed to one corner of the first transparent electrode 282 and collected in the reserve unit 281a of the chamber 281. In this case, the grating elements 211 may normally diffract the first illumination light. Moreover, when a voltage is applied to the first transparent electrode 282 and the second transparent electrode 283, the liquid droplets 264 may be electrically attracted to the first transparent electrode 282 and thus be uniformly distributed on the first transparent electrode 282. Then, the refractive index of the liquid droplets 284 may be almost the same as that of the grating elements 211, and thus a diffraction phenomenon due to the grating elements 211 may be suppressed. Thus, the light transmittance of the part in which the grating elements 211 are located may be adjusted through a function deterioration of the grating elements 211.

Although the one chamber 281 is illustrated in FIG. 20 for convenience of description, the plurality of chambers 281 and the plurality of first and second transparent electrodes 282 and 283 may be formed in each of a plurality of candidate areas in which the light leakage areas A1 through A8 may be present, and the chambers 281 may be respectively connected to the reserve units 281a through a path through which the liquid droplets 282 may move such as a micro-channel. The grating elements 211 may be disposed in the chambers 281. However, the chamber 281 may not be located in areas in which the light leakage areas A1 through A8 are not present. The grating elements 211 may be located outside the chamber 281 in such areas. That is, the grating elements 211 disposed in the candidate areas in which the light leakage areas A1 through A8 may be present, among the grating elements 211 provided on the light guide plate 210, may be located in the chamber 281, and the other grating elements 211 may be located outside the chamber 281.

The exemplary embodiments of a curved backlight unit and a curved display apparatus including the curved backlight unit have been described and shown in the accompanying drawings. However, it should be understood that such exemplary embodiments are merely intended to illustrate the present disclosure and not to limit the present disclosure. It should be also understood that the present disclosure is not limited to the illustrated and provided description. This is because various modifications may be made by those of ordinary skill in the art.

What is claimed is:

1. A backlight unit comprising:
   a curved light guide plate having a curvature;
   a first light source configured to provide a first illumination light to a first surface of the curved light guide plate;
   an array of a plurality of different grating elements disposed on a second surface of the curved light guide plate and configured to allow the first illumination light to exit the curved light guide plate from the second surface; and
   a second light source configured to provide a second illumination light to a third surface facing the second surface of the curved light guide plate,
   wherein the curved light guide plate comprises a first area configured to allow the second illumination light to exist at a first intensity and a second area configured to allow the second illumination light to exist at a second intensity that is less than the first intensity.

2. The backlight unit of claim 1, wherein the curved light guide plate comprises a light blocking member disposed in the second area and configured to at least partially absorb or reflect the second illumination light.

3. The backlight unit of claim 2, wherein the light blocking member is disposed on the third surface of the curved light guide plate.

4. The backlight unit of claim 3, wherein the curved light guide plate further comprises a transparent coating layer attached to the third surface of the curved light guide plate,
   wherein the light blocking member is disposed on the transparent coating layer, and a refractive index of the transparent coating layer is less than a refractive index of the curved light guide plate.

5. The backlight unit of claim 2, wherein the light blocking member is disposed in areas between the plurality of grating elements on the second surface of the curved light guide plate.

6. The backlight unit of claim 2, wherein the light blocking member is configured to electrically adjust a transmittance of the second illumination light via an electrowetting phenomenon.

7. The backlight unit of claim 1, wherein the plurality of different grating elements comprise a plurality of first grating elements configured to allow the first illumination light to exit from the second surface at a third intensity and disposed in the first area of the curved light guide plate and a plurality of second grating elements configured to allow the first illumination light to exit from the second surface at a fourth intensity less than the third intensity and disposed in the second area of the curved light guide plate.

8. The backlight unit of claim 7, wherein a height of the plurality of first grating elements is greater than a height of the plurality of second grating elements.

9. The backlight unit of claim 7, wherein a ratio of a pitch and a width of the plurality of first grating elements is within a range between about 0.4 and about 0.7, and a ratio of a pitch and a width of the plurality of second grating elements is within a range between about 0.1 and about 0.4 or between about 0.7 and about 0.9.

10. The backlight unit of claim 1, wherein the plurality of grating elements of the curved light guide plate have different pitches and orientations to allow the first illumination light to exit in different directions.

11. The backlight unit of claim 1, wherein the curved light guide plate is configured to allow the second illumination light to sequentially pass through the third surface and the second surface, and the plurality of grating elements is configured not to influence a travel direction of the second illumination light.

12. The backlight unit of claim 11,
    wherein the first light source comprises a blue light source configured to provide blue light, a green light source configured to provide green light, and a red light source configured to provide red light, and
    wherein the second light source comprises a white light source configured to provide white light.

13. The backlight unit of claim 1, further comprising:
    a first transparent electrode disposed on the third surface of the curved light guide plate and a second transparent electrode disposed on the second surface of the curved light guide plate,
    wherein the second transparent electrode comprises an array of a plurality of patterns, and
    wherein the plurality of grating elements is formed of a material that contracts or expands with temperature.

14. The backlight unit of claim 1, further comprising:
    a first transparent electrode disposed on an upper surface of the curved light guide plate, a second transparent electrode disposed to face the first transparent electrode, liquid droplets that move according to a voltage applied between the first transparent electrode and the second transparent electrode, and a chamber configured to seal the liquid droplets, wherein the chamber comprises a reservoir in which the liquid droplets are collected, wherein a refractive index of the liquid droplets is a same refractive index as a refractive index of the plurality of grating elements, and wherein a part of the plurality of grating elements provided on the curved light guide plate is disposed in the chamber.

15. A display apparatus comprising:
a display panel curved to have a certain curvature; and
a backlight unit configured to provide an illumination light to the display panel,
wherein the backlight unit comprises:
a curved light guide plate curved to have a certain curvature;
a first light source configured to provide a first illumination light to a first surface of the curved light guide plate;
an array of a plurality of different grating elements disposed on a second surface of the curved light guide plate and configured to allow the first illumination light to exit the curved light guide plate from the second surface; and
a second light source configured to provide a second illumination light to a third surface facing the second surface of the curved light guide plate,
wherein the curved light guide plate comprises a first area configured to allow the second illumination light to exist at a first intensity and a second area configured to allow the second illumination light to exit at a second intensity that is less than the first intensity.

16. The display apparatus of claim 15, wherein the display panel and the curved light guide plate are configured to have same curvature.

17. The display apparatus of claim 15, wherein the display panel comprises a 2D array of a plurality of pixels, and the plurality of grating elements of the curved light guide plate is disposed to correspond to the plurality of pixels of the display panel according to a one to one correspondence.

18. The display apparatus of claim 17, wherein the plurality of grating elements is configured to allow the second illumination light that exits from the second surface of the curved light guide plate by one of the plurality of grating elements to be incident onto one of the plurality of pixels of the display panel corresponding to the grating element.

19. The display apparatus of claim 15, wherein the plurality of different grating elements comprise a plurality of first grating elements configured to allow the first illumination light from the second surface to exit at a third intensity and disposed in the first area of the curved light guide plate and a plurality of second grating elements configured to allow the first illumination light to exit from the second surface at a fourth intensity less than the third intensity and disposed in the second area of the curved light guide plate.

20. The display apparatus of claim 19, wherein a height of the plurality of first grating elements is greater than a height of the plurality of second grating elements.

21. The display apparatus of claim 19, wherein a ratio of a pitch and a width of the plurality of first grating elements is within a range between about 0.4 and about 0.7, and a ratio of a pitch and a width of the plurality of second grating elements is within a range between about 0.1 and about 0.4 or between about 0.7 and about 0.9.

22. The display apparatus of claim 15, wherein the curved light guide plate is configured to allow the second illumination to sequentially pass through the third surface and the second surface, and the plurality of grating elements is configured not to influence a travel direction of the second illumination light.

23. The display apparatus of claim 15, wherein the curved light guide plate comprises a light blocking member disposed in the second area and configured to at least partially absorb or reflect the second illumination light.

24. The display apparatus of claim 23, wherein the light blocking member is disposed on the third surface of the curved light guide plate.

25. The display apparatus of claim 24, wherein the curved light guide plate further comprises:
a transparent coating layer attached to the third surface of the curved light guide plate,
wherein the light blocking member is disposed in the transparent coating layer, and a refractive index of the transparent coating layer is less than a refractive index of the curved light guide plate.

26. The display apparatus of claim 23, wherein the light blocking member is disposed in areas between the plurality of grating elements on the second surface of the curved light guide plate.

27. The display apparatus of claim 23, wherein the light blocking member is configured to electrically adjust a transmittance of the second illumination light via an electrowetting phenomenon.

28. The display apparatus of claim 15,
wherein the first light source comprises a blue light source configured to provide a blue light, a green light source configured to provide a green light, and a red light source configured to provide a red light, and
wherein the second light source comprises a white light source configured to provide a white light.

29. The display apparatus of claim 15, wherein while the display apparatus displays a 3D image, the first light source is turned on and the second light source is turned off, and while the display apparatus displays a 2D image, the first light source is turned off and the second light source is turned on.

30. The display apparatus of claim 15, further comprising:
a first transparent electrode disposed on the third surface of the curved light guide plate and a second transparent electrode disposed on the second surface of the curved light guide plate,
wherein the second transparent electrode comprises an array of a plurality of patterns, and
wherein the plurality of grating elements is formed of a material that contracts or expands with temperature.

31. The display apparatus of claim 15, further comprising:
a first transparent electrode disposed on an upper surface of the curved light guide plate, a second transparent electrode disposed to face the first transparent electrode, liquid droplets that move according to a voltage applied between the first transparent electrode and the second transparent electrode, and a chamber configured to seal the liquid droplets,
wherein the chamber comprises a reserve chamber in which the liquid droplets are collected,
wherein a refractive index of the liquid droplets is a same refractive index as a refractive index of the plurality of grating elements, and
wherein a part of the plurality of grating elements provided on the curved light guide plate is disposed in the chamber.

* * * * *